(12) United States Patent
Gibson et al.

(10) Patent No.: US 11,818,134 B1
(45) Date of Patent: Nov. 14, 2023

(54) VALIDATING APPLICATION PROGRAMMING INTERFACE (API) REQUESTS TO INFRASTRUCTURE SYSTEMS HOSTED IN A CLOUD COMPUTING ENVIRONMENT

(71) Applicant: Amazon Technologies, Inc., Seattle, WA (US)

(72) Inventors: Alex Gibson, Sydney (AU); Md Maruful Hassan, Sydney (AU); Seongyeol Cho, Epping (AU); Ethige Asin Kalmina Silva, Cranebrook (AU)

(73) Assignee: Amazon Technologies, Inc., Seattle, WA (US)

( * ) Notice: Subject to any disclaimer, the term of this patent is extended or adjusted under 35 U.S.C. 154(b) by 191 days.

(21) Appl. No.: 17/039,454

(22) Filed: Sep. 30, 2020

(51) Int. Cl.
*H04L 9/40* (2022.01)
*G06F 9/54* (2006.01)

(52) U.S. Cl.
CPC ............ *H04L 63/102* (2013.01); *G06F 9/547* (2013.01)

(58) Field of Classification Search
CPC .................................................... H04L 63/102
See application file for complete search history.

(56) References Cited

U.S. PATENT DOCUMENTS

| | | | |
|---|---|---|---|
| 9,602,482 B1* | 3/2017 | Roth | H04L 63/107 |
| 10,148,493 B1* | 12/2018 | Ennis, Jr. | H04L 67/10 |
| 10,333,979 B1* | 6/2019 | Stickle | H04L 63/0807 |
| 10,425,465 B1* | 9/2019 | Jha | H04L 67/565 |
| 10,437,712 B1* | 10/2019 | Tyler | G06F 11/3684 |
| 10,476,738 B1* | 11/2019 | Sharifi Mehr | H04L 43/062 |
| 10,489,224 B1* | 11/2019 | Wakelin | G06F 9/54 |
| 10,592,302 B1* | 3/2020 | Hinrichs | H04L 63/10 |
| 11,108,828 B1* | 8/2021 | Curtis | H04L 63/0263 |
| 11,170,099 B1* | 11/2021 | Sandall | G06F 21/54 |
| 11,228,573 B1* | 1/2022 | Rangasamy | H04L 12/40006 |
| 11,327,815 B1* | 5/2022 | Koponen | H04L 9/3236 |
| 2010/0077473 A1* | 3/2010 | Ohta | G06F 21/52 726/16 |
| 2015/0269377 A1* | 9/2015 | Gaddipati | G06F 21/44 726/30 |
| 2015/0350249 A1* | 12/2015 | Reno | H04L 63/1441 726/1 |
| 2018/0097768 A1* | 4/2018 | Ragsdale | H04L 67/02 |
| 2018/0309693 A1* | 10/2018 | Kimura | H04L 47/70 |
| 2018/0321993 A1* | 11/2018 | McClory | G06F 9/505 |
| 2018/0365440 A1* | 12/2018 | Horowitz | H04L 63/102 |
| 2019/0227856 A1* | 7/2019 | Xu | G06F 9/541 |
| 2019/0278928 A1* | 9/2019 | Rungta | G06F 9/5077 |
| 2020/0349569 A1* | 11/2020 | Murao | G06F 21/60 |

(Continued)

*Primary Examiner* — Jason Chiang
(74) *Attorney, Agent, or Firm* — NICHOLSON DE VOS WEBSTER & ELLIOTT LLP

(57) ABSTRACT

Techniques for performing application programming interface (API)-level validation of API requests to infrastructure resources in a cloud computing environment are provided. One technique includes receiving an API request from a user to access a cloud computing service in the cloud computing environment. A determination is made as to whether at least one action indicated in the API request is allowed to be performed, based at least in part on one or more parameters of the API request. Upon determining that the at least one action is allowed to be performed, the API request is forwarded to the cloud computing service.

20 Claims, 10 Drawing Sheets

(56) References Cited

U.S. PATENT DOCUMENTS

| | | | |
|---|---|---|---|
| 2021/0042207 A1* | 2/2021 | Joyce | G06F 11/3612 |
| 2021/0112059 A1* | 4/2021 | Heldman | H04L 67/10 |
| 2021/0240551 A1* | 8/2021 | Joyce | G06F 11/3688 |
| 2021/0306336 A1* | 9/2021 | Exton | H04L 63/101 |
| 2021/0336788 A1* | 10/2021 | Ziegler | H04L 67/56 |
| 2021/0359852 A1* | 11/2021 | Barrameda | H04L 9/0643 |
| 2021/0367919 A1* | 11/2021 | Palanisamy | H04L 63/0209 |
| 2021/0377247 A1* | 12/2021 | Nigro | H04L 9/3228 |
| 2022/0035689 A1* | 2/2022 | Raheja | G06F 9/541 |

\* cited by examiner

VALIDATING APPLICATION PROGRAMMING INTERFACE (API) REQUESTS TO INFRASTRUCTURE SYSTEMS HOSTED IN A CLOUD COMPUTING ENVIRONMENT

BACKGROUND

The present disclosure generally relates to cloud computing environments, and more specifically, to techniques for performing application programming interface (API)-level validation of actions within infrastructure resources hosted in a cloud computing environment.

Cloud computing environments provide users and enterprise customers (e.g., organizations, companies, etc.) with a variety of computing services. For example, an Infrastructure-as-a-Service (IaaS) environment may provision virtual server instances and deploy applications on those instances. In another example, the IaaS environment may provision relational database instances to handle application workloads, backups, storage, etc. In yet another example, the IaaS environment may provision storage infrastructure, networking infrastructure, application services, and development tools.

A cloud computing environment may be responsible for maintaining and managing the various computing services in the cloud environment on behalf of a user (or customer). For example, the cloud computing environment can monitor a user's infrastructure systems in the cloud environment, perform maintenance on the infrastructure systems, install software updates, maintain security and compliance with user-defined and/or cloud environment defined policies, etc. Detective controls are generally used to maintain security and compliance within user accounts in the cloud. Using detective controls, however, can increase security risks to the user's infrastructure systems. Additionally, once an event is detected with the detective controls, the controls can lead to time consuming and resource intensive remediation, which can impact performance within the cloud computing environment.

BRIEF DESCRIPTION OF DRAWINGS

Various embodiments in accordance with the present disclosure will be described with reference to the drawings, where like designations denote like elements.

DETAILED DESCRIPTION

Figure 1:
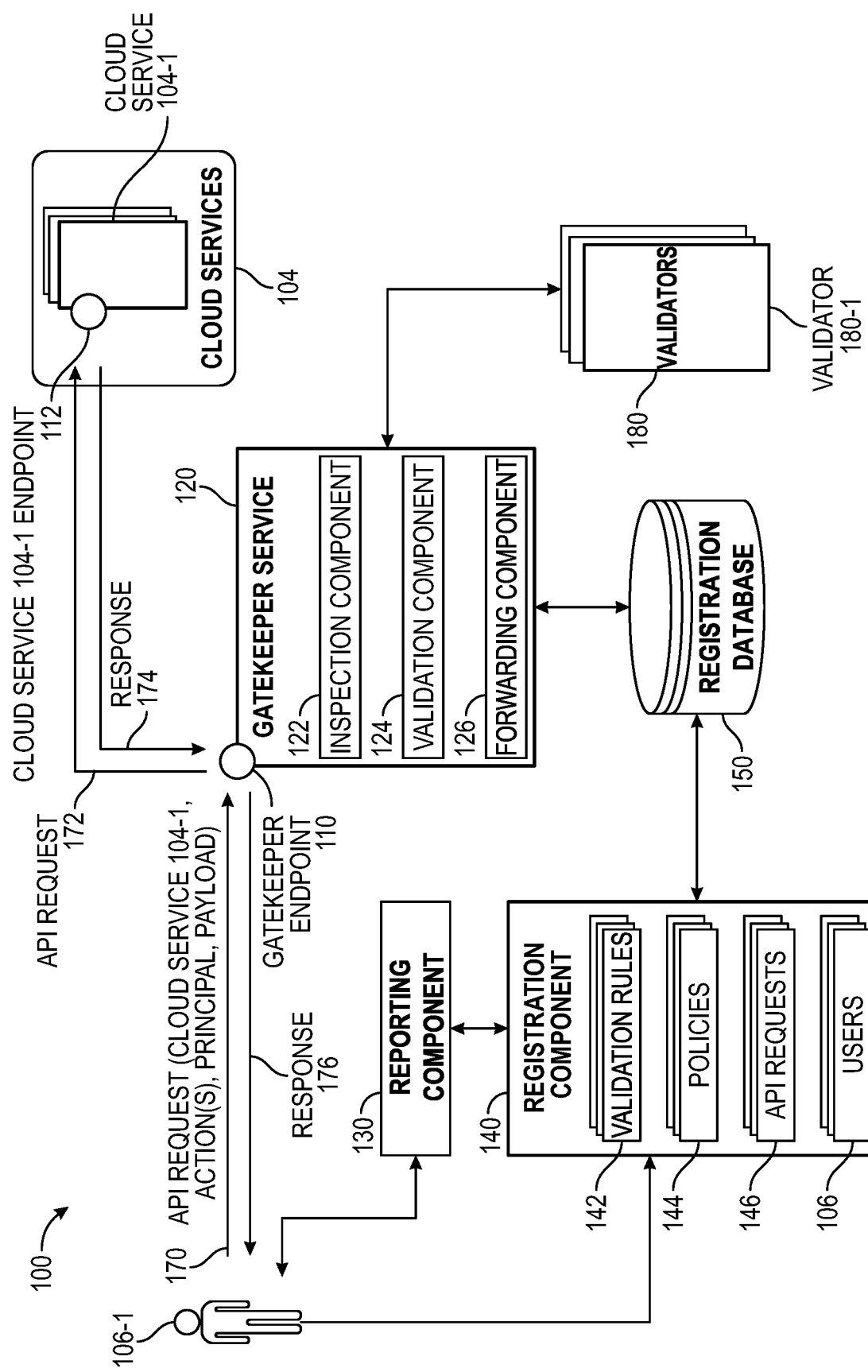
FIG. 1 illustrates an example network architecture for validating API requests to cloud computing services in a cloud computing environment, according to one embodiment.

A cloud computing environment may perform a variety of management and maintenance operations on behalf of a cloud computing user (or customer) (e.g., individual, organization, companies, etc.). For instance, the cloud computing environment may provide security management for the cloud computing user by monitoring for, detecting, and remediating security threats to the cloud computing user's infrastructure in the cloud computing environment. In another example, the cloud computing environment can monitor the activities (or actions) that are performed in the cloud computing environment to ensure that the activities are in compliance with the cloud computing user's policies and/or the cloud computing environment's policies.

In some cases, a cloud computing user can configure various user accounts (with different levels of permissions) as a means of controlling which actions are performed in the user's account. For example, a cloud computing user can configure identity access and management (IAM) permissions to implement preventative controls for the user's account. One issue with IAM, however, is that it allows the definition of controls, based on static information, but generally lacks the ability to provide controls based on dynamic conditions associated with a (current) state of the infrastructure resources. For example, a set of IAM permissions may specify that "User A is allowed to increase the storage size of relational database system B," but may not be able to specify that "User A is allowed to increase the storage size of relational database system B, when traffic to the application is below a threshold percentage."

Due to this lack of granular control associated with account permissions, cloud computing users typically have relied upon manual exception processes or custom built automation in a continuous integration/continuous deployment (CI/CD) pipeline to implement preventative controls with specific and distinct criteria. These manual exception processes, however, can be restrictive, inflexible, and cumbersome to implement for cloud computing users. As another alternative to account permissions, cloud computing users can use post-deployment tools to catch insecure and non-compliant activity within their user accounts. Remediation can then be performed once non-compliant activity is detected. These remediation steps, however, can be time-consuming and resource intensive, impacting the performance of the cloud computing environment.

To address this, embodiments provide techniques for performing API-level validation of actions within infrastructure resources hosted in a cloud computing environment. In particular, rather than relying on preventative controls (e.g., IAM permissions) implemented upstream from the API action (e.g., by the intended cloud computing service), embodiments provide techniques for validating API requests to particular cloud computing services prior to the intended cloud computing service receiving the API request. Compared to conventional prevention techniques, embodiments enable users to implement complex API request validation (that cannot be achieved through conventional IAM permissions) when performing requests to cloud computing services in the cloud computing environment.

As a reference example, the validation can ensure that a security group ingress rule cannot be created allowing a certain type of traffic on a particular port (e.g., transmission control protocol (TCP) traffic on port "X,"), unless the API request satisfies a specified condition (e.g., the IpAddress range is advertised over a dedicated network connection or is internal to the virtual network associated with the cloud computing user's account). In another reference example, the validation can ensure that clear text passwords are not stored within a template for provisioning cloud computing resources within a cloud computing user's account prior to deployment of the template. In yet another reference example, the validation can ensure that a machine image or storage snapshot is not shared to an account unassociated with the cloud computing user.

In some embodiments, the validation can be used to implement preventative controls that cannot be solved through conventional IAM permissions (e.g., where a certain cloud computing service does not support the particular conditions associated with the type of validation). As a reference example, the validation can ensure that a cache cluster (e.g., a collection of one or more cache nodes) is launched into a particular virtual network associated with the cloud computing user's account. As another reference example, the validation can restrict the set of security credentials (e.g., particular type of key pair, including a private key and a public key) that is used when creating cloud computing instances (e.g., only allow key pairs prefixed with "abc-" to be used when creating cloud computing instances).

In some embodiments, cloud computing users can implement validation of actions (e.g., determining whether an action(s) is safe to perform), based on the (current) state of infrastructure resources. As a reference example, the validation can ensure that a software deployment cannot occur if traffic to an application is above a threshold. As another reference example, the validation can prevent immutable changes to the user's account from occurring if a change control calendar is currently in a "closed" state.

As described in more detail below, embodiments enable a cloud computing user to activate (or register or apply) one or more validation rules for a given API request. In one example, a validation rule can be a custom validation rule configured by the cloud computing user. In another example, a validation rule can be a pre-defined validation rule configured by the cloud computing environment. In yet another example, a validation rule can be associated with a pre-defined policy that aligns with a particular compliance framework.

Additionally, embodiments enable a cloud computing user to register one or more policies for user accounts. Each policy may indicate which validation rules apply to which user accounts. For example, a first policy may specify that a first set of validation rules apply to users with "role A," a second policy may specify that a second set of validation rules apply to users with "role B," and so on.

As described in more detail below, embodiments expose a single endpoint to a validation service (referred to herein as a gatekeeper service (or component)) that sits in front of the cloud computing services in a cloud computing environment. Instead of allowing a direct API call to a given cloud computing service, each API request is directed to this entry endpoint for the gatekeeper service. The gatekeeper service can receive an API request to access a cloud computing service and perform one or more actions. As a reference example, the API request can be a request for a cloud computing service (e.g., relational database computing service) to provision a resource (e.g., database instance) (e.g., rds.CreateDbInstance API request) for the cloud computing user. The API request can be submitted using a variety of API tools, including, for example, Terraform, Cloud Endure, ServiceNow, etc.

Once the API request is received, the gatekeeper service can determine whether the API request should be validated, based on one or more parameters in the API request. These parameters can include, for example, the cloud computing service and/or action(s) requested, the user (or principal) making the request, validation rule(s) registered for the combination of user, cloud computing service, and action(s), the properties of the request payload, etc. If the gatekeeper service determines that validation should be performed, the gatekeeper service validates the API request based on the validation rules associated with the API request. For a valid API request, the gatekeeper service can pass the API request (or a message based on the API request) onto the appropriate cloud computing service endpoint, and pass the response (or a message based on the response) from the cloud computing service back to the cloud computing user. For an invalid API request, the gatekeeper service can reject the API request with a message indicating why it did not pass validation. In this manner, embodiments enable cloud computing users to perform complex validation of API requests in a manner that is transparent and user-configurable, without impacting performance of the cloud computing environment. For example, rather than restricting users to use a change management system that implements detective controls, embodiments can allow users to implement validation while deploying workloads using various API tools that perform native API calls, including, for example, Terraform, Cloud Endure, Service Now, etc.

As used herein, an infrastructure resource (also referred to as an infrastructure component, an infrastructure system, a computing resource, etc.) may refer to a resource hosted in a cloud computing environment, such as a cloud computing instance (also referred to as a virtual server instance), a database instance, a virtual network device, storage device, etc. Additionally, while many of the following embodiments use computing instances as reference examples of infrastructure resources that may be located in a cloud computing environment, the techniques presented herein can be used to validate API requests for any type of resource (e.g., data, applications, servers, operating systems, etc.) in a cloud computing environment. Similarly, while many of the following embodiments use an IaaS as a reference example of a cloud computing environment, the techniques presented herein can be used for other types of cloud computing environments, such as Platform-as-a-Service (PaaS) cloud computing environments, Software-as-a-Service (SaaS) cloud computing environments, Desktop-as-a-Service (DaaS) cloud computing environments, Disaster recovery-as-a-Service (DRaaS) cloud computing environments, and so on.

FIG. 1 illustrates an example network architecture 100 for performing API-level validation of requests to access cloud computing services in order to perform one or more actions, according to one embodiment. In one embodiment, the network architecture 100 is representative of a cloud computing environment that hosts multiple cloud computing services for one or more cloud computing users (or customers). Here, for example, the network architecture 100 includes one or more cloud services 104 (also referred to as cloud computing services) that provide a variety of services to users (or customers) 106. These services can include, for example, compute resources (e.g., processors, servers, etc.), storage, databases, analytics, networking, mobile, management tools, security, applications, etc. The network architecture 100 generally represents an IaaS provider setting that offers IaaS services to a cloud computing user (e.g., an enterprise, individual, organization, etc.).

The network architecture 100 also includes services for performing validation of API requests to the cloud services 104. As shown, the network architecture 100 includes a gatekeeper service 120, a reporting component 130, a registration component 140, and a registration database 150, each of which can include software, hardware, or combinations thereof. The gatekeeper service 120 is generally configured to validate API requests received from a user 106, based on configured validation rules for the API requests, and proxy the API requests to the appropriate cloud services 104. In some embodiments, a gatekeeper service 120 may be maintained for each cloud computing user account. For example, the gatekeeper service 120 can be a separate user account associated with the cloud computing user 106 or a virtual network (e.g., virtual private cloud) located within the user's existing account. The gatekeeper service 120 includes an inspection component 122, a validation component 124, and a forwarding component 126, which are described in more detail below.

In one embodiment, the registration component 140 is a control plane API for registering validation rules 142 and/or (governance) policies 144. The validation rules 142 and/or policies 144 can be made applicable to one or more API requests 146, cloud services 104, and/or users 106. For example, a validation rule 142 can define which API requests 146 are subject to the validation rule 142, which users 106 are subject to the validation rule 142, etc. Similarly, a (governance) policy 144 can indicate which validation rules 142 apply to which users 106 and/or an operating mode (e.g., enforcing mode, reporting mode) associated with the validation rule. Once a set of validation rules 142 and/or policies 144 are registered, the validation rules 142 and/or policies 144 can be stored in the registration database 150 (or, more generally, a storage location in the cloud computing environment) for later retrieval by one or more components (e.g., gatekeeper service 120) in the network architecture 100.

In one embodiment, a validation rule 142 associates a cloud service 104 and one or more actions to a set of validators 180. For example, a validation rule 142 can be created to authorize security ingresses to a cloud service 104 that provisions compute instances to cloud computing users. In another example, a validation rule 142 can be created to validate the provisioning of resources to cloud computing users by a cloud service 104.

Each validator 180 can be a computing system that implements logic to decide if an API request 146 (e.g., to perform an API action) should be allowed or not. In one embodiment, each validator 180 can be one of the following validator types: custom, managed, time-based, alarm, in-built (also referred to as validation engine), and auto-validator. A validator 180 that has a "custom" validator type includes logic built and configured by the cloud computing user. For example, this logic can be based on one or more customer configured factors, including, but not limited to, the (current) state of an infrastructure resource(s) in the user's account (e.g., the current traffic load on an application), etc. In general, any logic can be implemented with the "custom" validator type, including requests to sub-dependencies, in order to determine if the API request 146 should be allowed or rejected at that given point in time (e.g., upon reception of the API request 146 by the gatekeeper service 120).

In one embodiment, the logic contained in the "custom" validation rule can be invoked and executed via an event-driven computing engine (or service). An event-driven computing engine is generally a serverless function implementation. For example, the event-driven computing engine is configured to automatically execute (serverless) functions in response to a predefined trigger. The serverless function(s) may be a custom configured function(s) that is hosted and maintained on infrastructure in the cloud computing environment. In this instance, the gatekeeper service 120 can the trigger the event-driven computing engine to execute the logic contained in the "custom" validation rule, upon determining that an API request is subject to the "custom" validation rule. For example, the gatekeeper service 120 can invoke (or call) the event-driven computing engine and pass the API request parameters, including, for example, the cloud service, the action(s), the principal, and payload.

A validator 180 that has a "managed" validator type includes logic built and configured by one or more administrators of the cloud computing environment. These "managed" validator rules may be pre-defined and enabled by the cloud computing user and/or enabled by the administrator of the cloud computing environment. In some cases, these predefined validation rules can be used for scenarios that are applicable to several cloud computing users and/or to ensure that a user account is in compliance with security protocols used within the cloud computing environment.

In one embodiment, the "managed" validation rule can validate whether an API action is allowed based on complex logic involving the API request parameters (or properties). For example, a predefined validation rule may specify that a security group ingress for a computing instance can be created only if it does not allows traffic on a port that is open to a public IP address range. In another example, a pre-defined validation rule may specify that an in-memory data store cluster has to be launched inside of a virtual network (e.g., virtual private cloud).

In another embodiment, the "managed" validation rule can validate whether an API action is allowed based on complex logic involving the API request parameters and customer specific criteria. For example, a predefined validation rule may specify that a security group ingress for a computing instance can only contain IP ranges A.B.0.0/24. Similar to the "custom" validator type, the logic contained in the "managed" validator type can be invoked and executed via an event-driven computing engine.

A validator 180 that has a "time-based" validator type is generally configured to validate whether an API action is allowed during a certain time period. For example, a "time-based" validation rule can indicate (i) whether the API request 146 occurs during a "closed" state, (ii) when access to the particular cloud service 104 is restricted and/or (iii) whether the particular type of API action requested is restricted. In one embodiment, the "time-based" validator can include a change calendar that is shared with the gatekeeper service 120. The calendar can indicate time periods when changes to the cloud service 104 are allowed (e.g., "open" state) and time periods when changes to the cloud service 104 are not allowed (e.g., "closed" state). For API requests 146 that are subject to a "time-based" validator type, the gatekeeper service 120 can query the change calendar and (i) prevent the API request 146 from proceeding when the calendar is currently in a "closed" state or (ii) allow the API request 146 to proceed when the calendar is currently in an "open" state.

A validator 180 that has an "alarm" validator type is generally configured to indicate whether the API request 146 occurs during a specified "alarm" state. For example, the user can configure an alarm and associate it with a specified metric associated with an infrastructure resource (e.g., traffic load on an application is greater than a threshold). When the specific metric is met, this may trigger the alarm state to change (e.g., to "On," or "Activated," or "Alarm"), and trigger a notification to be sent to the user. For API requests 146 that are subject to an "alarm" validator type, the gatekeeper service 120 can query the state of the alarm associated with the API request 146. If the alarm is in the specified state (e.g., "Alarm" or "Insufficient Data"), the gatekeeper service 120 can prevent the API request 146 from proceeding. If the alarm is not in the specified state, the gatekeeper service 120 can allow the API request 146 to proceed to the given cloud service 104.

A validator 180 that has an "in-built" (or validation engine) validator type is generally configured to perform validation, based on validation logic defined directly in the validator definition (of the validation rule). For example, instead of calling (or invoking) an event-driven computing engine to execute logic contained in a validation rule associated with an API request 146, the gatekeeper service 120 can include a custom "validation engine" that allows the customer to define validation logic directly in the validator definition. In one embodiment, the validation engine is used for validating whether an API action is allowed based on properties included within the API request 146. For example, an "in-built" validation rule for an API request to create a cloud computing instance may specify that only key pairs prefixed with "abc-" can be used when creating cloud computing instances. In this example, the gatekeeper service 120 (via the validation engine) can evaluate the request payload to determine whether the key pairs satisfy this validation rule.

In one embodiment, the validation engine can validate whether an API action is allowed, based on conditions involving the API request parameters. For example, an "in-built" validation rule for an API request to launch a cloud computing instance may specify that a cloud computing instance cannot be launched if the volume size is greater than a threshold size. In this example, the gatekeeper service 120 (via the validation engine) can evaluate the request payload to determine whether the volume size parameter in the API request payload satisfies the condition of this validation rule. The functions supported by the validation engine can include, but are not limited to, Boolean logic (e.g., AND, OR, NOT), conditions (e.g., if, else, greater/less than, etc.), etc.

A validator 180 that has an "auto-validator" validator type is generally configured to perform validation, based on machine learning techniques. For example, a validator 180 of the "auto-validator" validator type can use a machine learning model to determine whether an API action (e.g., change) to an infrastructure resource is safe to perform at a given point in time. In one embodiment, the "auto-validator" can evaluate the configuration of the infrastructure resources used within the user account and map the relationship between the resources. The "auto-validator" can then use predictive analytics to determine whether an API action is safe to perform, based on the state of the target infrastructure resource and its dependencies. The "auto-validator" validator type is described in more detail below with respect to FIG. 3.

In one embodiment, the registration component 140 may support one or more API actions that enable cloud computing user 106 to manage validation rules 142 that apply to the user's account. For example, the API actions can include, but are not limited to, "CreateRule" (e.g., for creating a validation rule) "DeleteRule" (e.g., for deleting a validation rule), "UpdateRule" (e.g., for updating a validation rule), and "DescribeRules" (e.g., for obtaining the properties of a validation rule).

In one reference example, the CreateRule API can be used to create a validation rule "EC2SecurityGroupIngressNoPublicIPs" with a custom validator to prevent public IP ranges. As shown below, this validation rule can include the properties "Name," "Description," "Service," "Actions," "DefaultValidationFailureMessage," and "Validators."

CreateRule API{
"Name": "EC2SecurityGroupIngressNoPublicIPs",
"Description": "Prohibits access from public IP ranges in production environment"
"Service": "ec2",
"Actions": ["authorizeSecurityIngress"],
"DefaultValidationFailureMessage": "Public network access is prohibited."
"Validators": [
{
"Type": "Custom",
"Identifier": "Event-driven computing engine A",
}]}.

In another reference example, the CreateRule API can be used to create a validation rule "NoChangesonRestrictedDays" to prevent mutating API requests during restricted days. As shown below, this validation rule can include the properties "Name," "Description," "Service," "Actions," "Exclusions," "DefaultValidationFailureMessage," and "Validators."

CreateRule API{
"Name": "NoChangesonRestrictedDays",
"Description": "Prohibits infrastructure changes on restricted days"
"Service": "*",
"Actions": ["Create*", "Delete*", "Update*", "Put*"],
"Exclusions": [
{"Service": "cloudserviceA", "Actions": ["Put*", "DeleteItem"]},
{"Service": "cloudserviceB", "Actions": ["PutObject", "DeleteObject"]}
],
"DefaultValidationFailureMessage": "No changes allowed during restricted window",
"Validators": [
{
"Type": "ChangeCalendar",
"Identifier": "Region A",
}]}.

In some embodiments, a cloud computing user 106 can interact with the registration component 140 to register policies 144 (also referred to as governance policies). Each policy 144 indicates which validation rules 142 apply to which users 106 (or principals). The policy 144 can also indicate an operating mode for the validation rules. In one example, the operating mode can be put in an enforcing mode, where the validation rules are enforced for a given user 106. In another example, the operating mode can be put in a reporting mode, where the validation rules are not enforced, but are logged by the gatekeeper service 120. In this reporting mode, for example, the gatekeeper service 120 can pass an API request 146 to a cloud service 104 (e.g., regardless of whether the API request is validated), but indicate whether the API request 146 would have been denied (e.g., for not passing an associated validation rule 142) if the validation rule was being enforced.

In one embodiment, the registration component 140 may support one or more API actions that enable cloud computing user 106 to manage validation rules 142 that apply to the user's account. For example, the API actions can include, but are not limited to, "CreatePolicy" (e.g., for creating a governance policy) "DeletePolicy" (e.g., for deleting a governance policy), "UpdatePolicy" (e.g., for updating a governance policy), and "DescribePolicies" (e.g., for obtaining the properties of a governance policy). In one reference example, the CreatePolicyAPl can be used to create a governance policy for Payment Card Industry Data Security Standard (PCI-DSS) Workloads "PCI-DSS workloads". As shown below, this governance policy can include the properties "PolicyName," "Principal," "Mode," and "ValidationRules."

CreatePolicy API{
"PolicyName": "PCI-DSS workloads",
"Principal": {"IAM": [User 106-1]},
"Mode": "enforcing", #Alternate value: "reporting" will allow request but log,
"ValidationRules": [
    "SecurityGroupManagementPortPublicAccess",
    "NoSecurityGroupPublicAccesstoRDSDbInstances"
]}.

In one embodiment, the reporting component 130 allows a cloud computing user 106 to generate reports regarding enforcement of the validation rules 142 within a user account. For example, the reporting component 130 can interact with the registration component 140 (and/or registration database 150) to generate a report indicating which validation rules 142 are enforced within an account, which validation rules 142 were enforced at any given point in time (e.g., for audit reporting), etc. In one embodiment, the reporting component 130 can pull the "Description" fields from the validation rules 142 to generate a user-readable report showing which validation rules are being enforced.

In some embodiments, the reporting component 130 can generate a report indicating which API requests 146 were allowed to pass to a cloud service 104, but would have been rejected (e.g., for failing an associated validation rule 142). That is, the reporting component 130 can generate reports on which validation rules 142 have been triggered and whether/what action was taken. In one embodiment, the reporting component 130 can pull the "ValidationRules" field from the (governance) policy 144 and the associated "Description" fields for the validation rules 142 listed in the "ValidationRules" field to generate this report.

As shown in FIG. 1, the gatekeeper service 120 exposes a single endpoint (e.g., gatekeeper 110) that acts as the entry point for each of the cloud services 104. Thus, instead of making a direct call to the cloud service endpoint 112, users 106 can submit API requests to a cloud service 104 using the gatekeeper endpoint 110. In one embodiment, the user 106 can set the cloud computing service endpoint in an API tool used to submit the API request to the gatekeeper endpoint 110. For example, the user can make a configuration change in the API tool or software development kit.

In one embodiment, access to the gatekeeper endpoint 110 is not made publically available. For example, the gatekeeper endpoint 110 can be exposed via one or more virtual network (e.g., virtual private cloud) interface endpoints. As shown in FIG. 1, for example, user 106-1 submits an API request (to access a cloud service 104-1 and perform one or more API action(s)) to the gatekeeper service 120 using the gatekeeper endpoint 110 (step 170). In one embodiment described in more detail below, bypass of the gatekeeper service 120 can be prevented by having the user's IAM permissions include sourceIP and source_endpoint conditional restrictions set to the values of the source IP and source endpoint, respectively, of the gatekeeper service 120.

Once the API request is received, the gatekeeper service 120 can determine (via the inspection component 122) the properties and payload of the API request. The gatekeeper service 120 can interact (via the validation component 124) with the registration database 150 to determine whether the API request should be validated. For example, the gatekeeper service 120 can query (via validation component 124) the registration database 150 for validation rules 142 associated with the API request. In another example, the gatekeeper service 120 can query (via validation component 124) the registration database 150 for policies 144 associated with user 106-1. In yet another example, the gatekeeper service 120 can determine (via validation component 124) the operating mode (e.g., enforcing mode or reporting mode) for any applicable validation rules 142 and/or policies 144.

If the gatekeeper service 120 determines that the API request is subject to validation, the gatekeeper service 120 may trigger the validator(s) 180 (indicated in the associated validation rule 142) to perform validation of the API request. Here, for example, the gatekeeper service 120 triggers validator 180-1 to perform validation of the API request. As noted above, the validator(s) 180 can include external validators (e.g., cloud computing services) in the cloud computing environment (e.g., event-driven computing engines, change calendar services, alarm services, etc.) or internal validators (e.g., an in-built assertion engine within the validation component 124, auto-validator, etc.).

Upon determining that the validation has succeeded (or determining that the API request is not subject to validation), the gatekeeper service 120 forwards (via the forwarding component 126) the API request to the cloud service 104-1 endpoint 112 (step 172). In one embodiment, the gatekeeper service 120 forwards the API request without rewriting (or modifying) the API call. In this manner, the API request can be forwarded onto the backend cloud service 104-1 while maintaining the authorization with the caller (e.g., user 106-1). Similarly, the gatekeeper service 120 does not need API permissions for the API request in the user's account. In some embodiments, rather than forwarding the API request, the gatekeeper service 120 may generate and send a message based on the API request to the cloud service 104-1 endpoint 112. For example, the gatekeeper service 120 may modify at least one parameter or property of the API request prior to sending the modified message to the cloud service 104-1 endpoint 112.

The gatekeeper service 120 (via the forwarding component 126) receives the API response from the cloud service 104-1 (step 174) and forwards the API response to the user 106-1 (step 176). In some embodiments, the gatekeeper service 120 forwards the API response from the cloud service 104-1 without modifying the contents of the response. In other embodiments, the gatekeeper service 120 can generate and send another message based on the API response. For example, the gatekeeper service 120 can append a message containing reporting information to the API response from the cloud service 104-1. For instance, in scenarios where a validation rule 142 is in a "reporting mode," the gatekeeper service 120 can indicate whether the validation rule was triggered and the action that would have been performed (e.g., deny, approve, etc.). Although not shown in FIG. 1, upon determining that the validation has failed, the gatekeeper service 120 can reject the API request with a message indicating why the API request did not pass validation.

Figure 2:
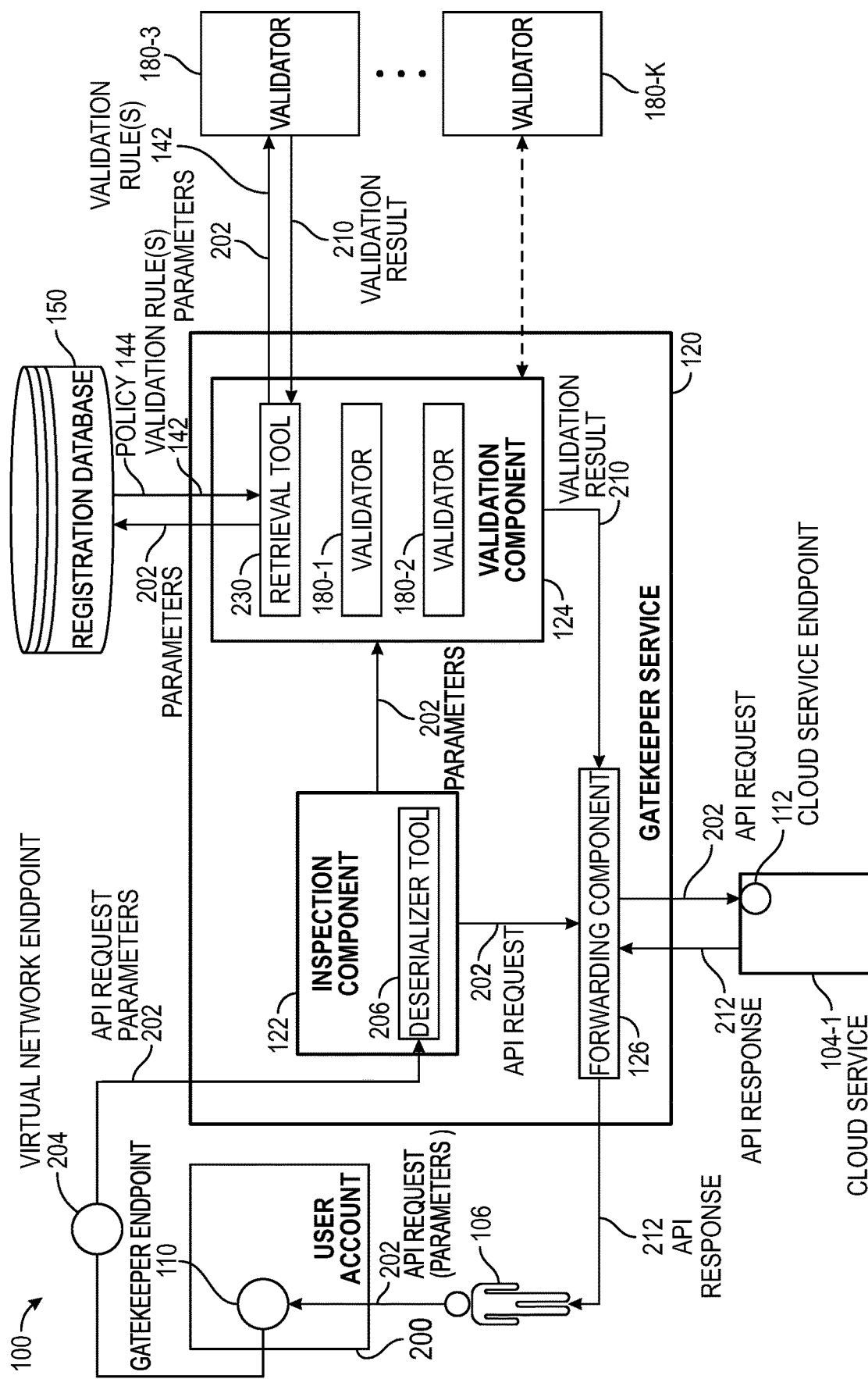
FIG. 2 illustrates an example deployment of components of the network architecture described relative to FIG. 1, according to one embodiment.

FIG. 2 further illustrates components of the network architecture 100, described relative to FIG. 1, according to one embodiment. Here, the user 106 associated with user (or customer) account 200 submits an API request containing parameters 202 (e.g., cloud service, action(s), principal, payload, payload properties, etc.) to the gatekeeper service endpoint 110. The API request is then forwarded to the gatekeeper service 120 via the virtual network endpoint 204 (e.g., virtual private cloud (VPC) endpoint). In one reference example, the API request can be a request to create a database instance "CreateDbInstance API," as shown below:

cloudservice104-1.create-db-instance—engine mysql \
    --db-instance-identifier MyDatabase \
    --db-name MyDb\
    --db-instance-class db.m4.large \
    --allocated-storage 20 \
    --master-username master \
    --master-user-password *****\
    --region us-east-1 \
    --endpoint-url https://gatekeeper-domain.com In one embodiment, the API request can include IAM permissions that prevent the user 106 from bypassing the gatekeeper service endpoint 110. For example, the IAM permissions for a user that submits the API request "CreateDbInstance API" can include the gatekeeper service account IP and/or the gatekeeper service account endpoint as conditional restrictions:

{
    "Statement": [
    {
       "Effect": "Allow",
       "Action": ["rds:createDbInstance" ],
       "Resource": ["*" ]
    }],
    "Conditions": {
       "IpAddress": {
       "SourceIp": [<IPs of Gatekeeper Service account NAT Gateways>]
       "SourceVpc": [<endpoints of Gatekeeper Service account VPC>]
    }}}.

With the above restrictions, if the user 106 attempted to make a direct API call to the cloud service endpoint 112, the user 106 would not be authenticated to do so, based on the conditional restrictions in their IAM policy. In another example, the following IAM policy can be attached to any user/role that has to use the gatekeeper service 120 to make API requests.

{
    "Statement": [
    {
       "Effect": "Deny",
       "Resource": "*",
       "Action": "*",
    "Condition": {
       "NotIpAddress": {
       "gatekeeper:SourceIp": [
          "Gatekeeper NAT GW IP 1",
          "Gatekeeper NAT GW IP 2"
    ]}}}]}.

Although not shown, note that the user 106 may interact with the cloud computing environment via a computing system, which can be representative of a variety of computing devices (systems) including, for example, a desktop computer, a laptop computer, a mobile computer (e.g., a tablet or a smartphone), etc. In some embodiments, this computing system may connect to the cloud computing environment via another network (e.g., the Internet).

Once the gatekeeper service 120 receives the API request, the gatekeeper service 120 uses the inspection component 122 to retrieve parameters 202 from the API request. In one embodiment, the inspection component 122 includes a deserializer tool 206, which is configured to deserialize the request in order to determine the parameters 202. Continuing with the above example API request "CreateDBInstance API," the inspection component 122 (via the deserializer tool 206) can determine the following: (i) intended service (e.g., cloud service 104-1); (ii) intended action (e.g., CreateDBInstance); (iii) intended region (e.g., us-east-1); (iv) the downstream service endpoint URL (e.g., https://gatekeeper-domain.com); (v) the payload properties deserialized into the appropriate SDK struct; (vi) the IAM principal ID (derived from the authentication signature); and (vii) the protocol type (e.g. Query, XML, REST, JSON-RPC, etc.).

The inspection component 122 sends the parameters 202 to the validation component 124, which determines whether the API request is associated with a registered validation rule. For example, the validation component 124 includes a retrieval tool 230 which queries the registration database 150 to determine if there are any registered validation rules 142 and/or policies 144 for the API request. If the validation component 124 determines there are no validation rules 142 and/or policies 144 associated with the API request, then the validation component 124 triggers the forwarding component 126 to forward the API request to the (downstream) cloud service 104-1. The forwarding component 126 then relays the API response 212 (from the cloud service 104-1) to the user 106.

If the validation component 124 determines there is a registered validation rule 142 and/or policy 144, then the validation component 124 invokes the appropriate validator 180, passing it the validation rule 142 and parameters 202 (e.g., the request payload), if required by that validator 180. Here, for example, the validation component 124 (via the retrieval tool 230) sends the validation rule(s) 142 and parameters 202 to the validator 180-3 in order for the validator 180-3 to perform validation of the API request. In some embodiments, as opposed to invoking an external validator (e.g., validators 180-3 to 180-K), the validation component 124 can use an internal validator, e.g., an in-built validation engine (validator 180-1), an auto-validator (validator 180-2), etc., to validate the API request.

If at least one of the validators 180 that is invoked by the validation component 124 determines that the API request is not valid, the validation component 124 passes a validation result indicating validation failure to the forwarding component 126. This validation result prompts the forwarding component 126 to send a rejection message back to the caller (e.g., user 106). On the other hand, if each of the validators 180 determines that the API request is valid, the validation component 124 passes a validation result indicating validation success (or pass) to the forwarding component 126. This validation result prompts the forwarding component 126 to forward the API request to the cloud service 104-1 and relay the API response 212 (from the cloud service 104-1) to the caller (e.g., user 106).

Note that in embodiments described herein, the validation component 124 uses a logical AND when querying the validators 180. That is, if one of the validators 180 returns a validation result indicating failure (e.g., indicating that the API request did not pass validation), the API request is rejected. In one embodiment, the validation component 124 may aggregate each message (containing the respective validation result) from the validators 180, and return the messages to the caller (e.g., user 106) along with the API response 212.

Note that the embodiment illustrated in FIG. 2 represents a reference example of an implementation for validating an API request. In other embodiments, rather than proxying API requests at a single endpoint (e.g., gatekeeper endpoint 110), the gatekeeper service 120 functionality can be distributed across each cloud service 104 and performed as part of initial request processing. For example, after authenticating and authorizing a request, the cloud service 104 can query the gatekeeper service 120 to determine whether the combination of user, cloud service and requested API action has any registered validation rules. If so, the cloud service 120 can forward the API request to the gatekeeper service 120 to perform the validation. In some embodiments, this implementation may involve using local caching to improve performance and reduce reliance on availability of the gatekeeper service 120. In yet another embodiment, rather than proxying API requests at a single endpoint (e.g., gatekeeper endpoint 110), the gatekeeper service 120 functionality can be built into the existing cloud service authentication process.

Figure 3:
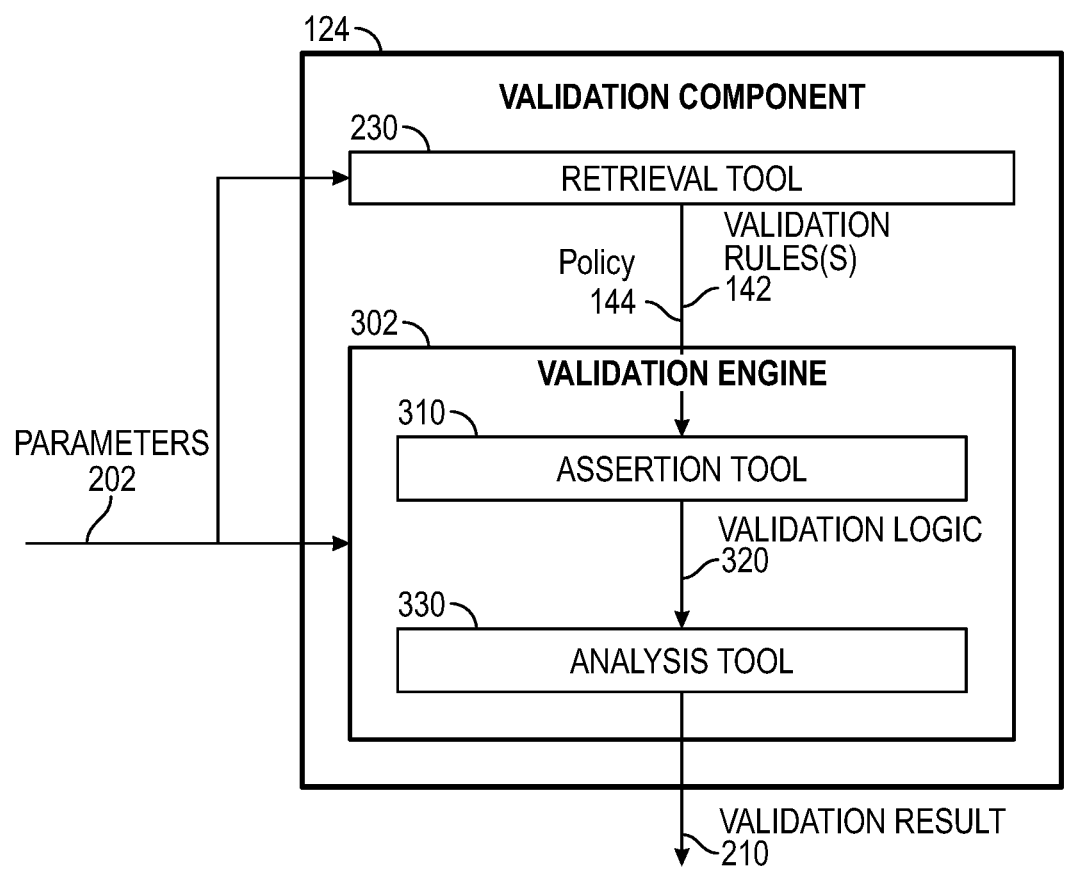
FIG. 3 illustrates an example validation component, according to one embodiment.

FIG. 3 further illustrates the validation component 124, described relative to FIG. 2, according to one embodiment. Here, the validation component 124 includes the retrieval tool 230 and a validation engine 302. The validation engine 302 is representative of a validator 180 (e.g., validator 180-1) that is internal to the validation component 124 (e.g., in-built validator type).

Here, the validation engine 302 is configured to execute validation logic (also referred to as assertion logic) 320 defined directly in the validator definition of the validation rule 142. The validation logic 320 may be based on the properties included in the API request itself. In some cases, the validation engine 302 can be used when IAM conditions are absent and/or when IAM conditions are insufficient at providing the desired control. For example, the validation engine 302 may be able to analyze a rule that specifies "Do not allow the RunInstances API request if a key pair has been specified." In one embodiment, the validation engine 302 can support validation functions of various syntax. For example, the validation engine 302 can support intrinsic functions (e.g., Join, Select, Split, Sub, Ref, Calc), condition functions (e.g., If, Not, Or, And, Equals, Greater, Lesser, Exists), nested functions, web console or command line interface.

As shown in FIG. 3, the validation engine 302 includes the assertion tool 310 and analysis tool 330. The assertion tool 310 is configured to extract the validation logic (or assertion logic) 320 from the validation rule 142. The analysis tool 330 is configured to process the validation logic 320 to determine the validation result 210. The following shows one reference example of validation logic that can be extracted by the assertion tool 310 and executed by the analysis tool 330. This particular example validation logic can be defined in a validation definition of a validation rule for relational database storage encryption enforcement:

{
    "Assertion": {

"Fn::And": [
    {"Fn::Equals": [{"Ref": "payload.Engine"},
        "mysql"] },
    {"Fn::Equals": [{"Ref": "payload.StorageEn-
        crypted"}, "false"]}]
},
"Error": "Storage must be encrypted if engine type is mysql."}.

Figure 4:
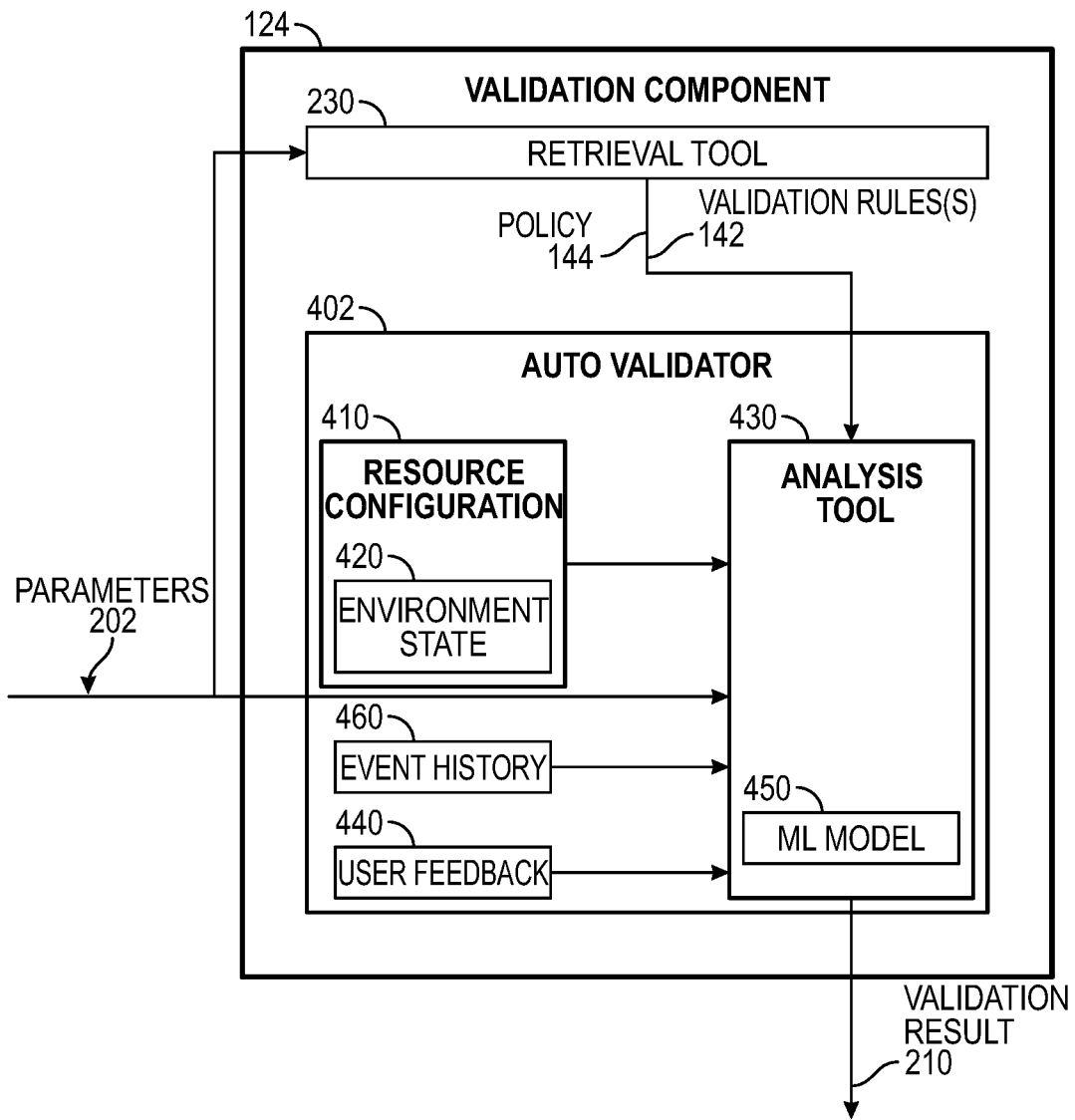
FIG. 4 illustrates another example validation component, according to one embodiment.

FIG. 4 further illustrates the validation component 124, described relative to FIG. 2, according to another embodiment. Here, the validation component 124 includes the retrieval tool 230 and an auto validator 402. The auto validator is representative of a validator 180 (e.g., validator 180-2) that is internal to the validation component 124 (e.g., "auto-validator" validator type).

Here, the auto validator 402 is configured to use machine learning techniques to determine whether an API request is safe to perform at a given point in time. For example, the auto validator 402 can determine a resource configuration 410 indicating a relationship between infrastructure resources used within the user account (e.g., user account 200). The auto validator 402 can evaluate the resource configuration 410 to determine a current environmental state 420 of the resources.

In one embodiment, the auto validator 402 uses the analysis tool 430 to evaluate the resource configuration 410 (including the environmental state 420) and the parameters 202 with the machine learning (ML) model 450 to determine the validation result 210. For example, assume a user submits an API request to delete an ingress rule from a security group. Assuming this API request is subject to the "auto-validator" validator type, the "auto-validator" can determine, based on an evaluation of the resource configuration 410, that the ingress rule is being used to allow traffic between a cloud computing instance and a relational database instance. The "auto-validator" can query traffic flow logs and determine (based on the environmental state 420) that traffic is currently being transmitted between these resources. Based on this current state of the resources, the "auto-validator" can prevent the user from removing the ingress rule (e.g., validation result 210=false (or fail)).

In another embodiment, the auto validator 402 uses the analysis tool 430 to evaluate the resource configuration 410, parameters 202, and event history 460 with the ML model 450 to determine the validation result 210. For example, assume a user submits an API request to resize a cloud computing instance from a first size (e.g., m5.large) to a second size (e.g., m5.2xlarge). In this example, the analysis tool 430 can determine, from the environmental state 420, that there is an active event where volumes are getting stuck in an attaching state. The analysis tool 430 can also determine, from the event history 460, that this type of active event has previously impacted customers when an instance resize is attempted. Thus, based on this information, the auto validator 402 can return a validation result 210=fail, to prevent the API action from occurring.

In some embodiments, the auto validator 402 can additionally evaluate user feedback 440 with the ML model 450 to determine the validation result 210. For example, the validation component 124 can provide a feedback mechanism to allow a user to report when an API action leads to an incident and the set of conditions that contributed to the incident. For instance, assume that the memory size of a function (e.g., an event-driven computing engine function) that is processing data is reduced from a first size to a smaller second size, causing a reduction in available processing power. In this example, a user may later discover that this change was a cause of data loss, since the function was unable to keep up with the data stream. The user may report the API action (e.g., UpdateFunctionConfiguration( ) and the set of conditions (e.g., first size, second size, etc.) as contributing to a data outage (represented as user feedback 440). The analysis tool 430 may use this information to predict when future related changes may lead to similar events.

Figure 5:
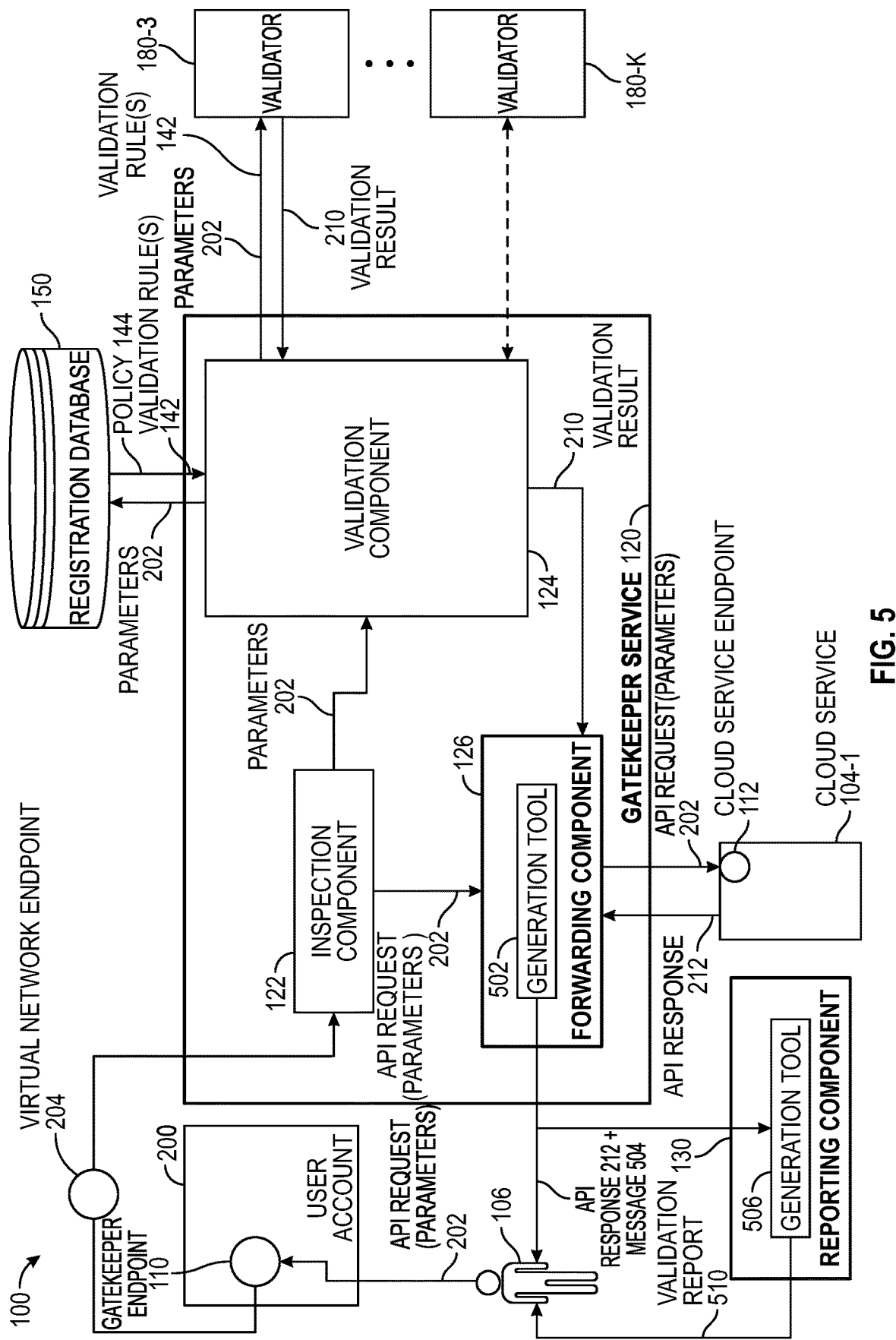
FIG. 5 illustrates another example deployment of components of the network architecture described relative to FIG. 1, according to one embodiment.

FIG. 5 further illustrates components of the network architecture 100, described relative to FIG. 1, according to one embodiment. Compared to the network architecture 100 depicted in FIG. 2, here the forwarding component 126 includes a generation tool 502, which is configured to append information regarding validation results to an API response 212 received from cloud service 104-1. For example, in some embodiments, the gatekeeper service 120 may determine that the operating mode for validation of an API request is currently set to "reporting," based on the policy 144 associated with the validation rule 142 for the API request. In these instances, the gatekeeper service 120 may forward the API request received from a user to the cloud service (e.g., regardless of whether it is subject to a validation rule), and relay the API response 212 from the cloud service to the user.

As depicted in FIG. 5, however, in some embodiments, the gatekeeper service 120 can provide information regarding the validation of the API request along with the API response 212. For example, this information can indicate whether a validation rule was triggered, and if so, what the validation result would have been for the API request. Here, the generation tool 502 can generate a message 504 containing the information and forward the API response 212 along with the generated message 504 to the user. In some embodiments, the API response 212 and the message 504 can be provided to the reporting component 130. The reporting component 130 can use the generation tool 506 to generate a validation report 510, based on the information.

Figure 6:
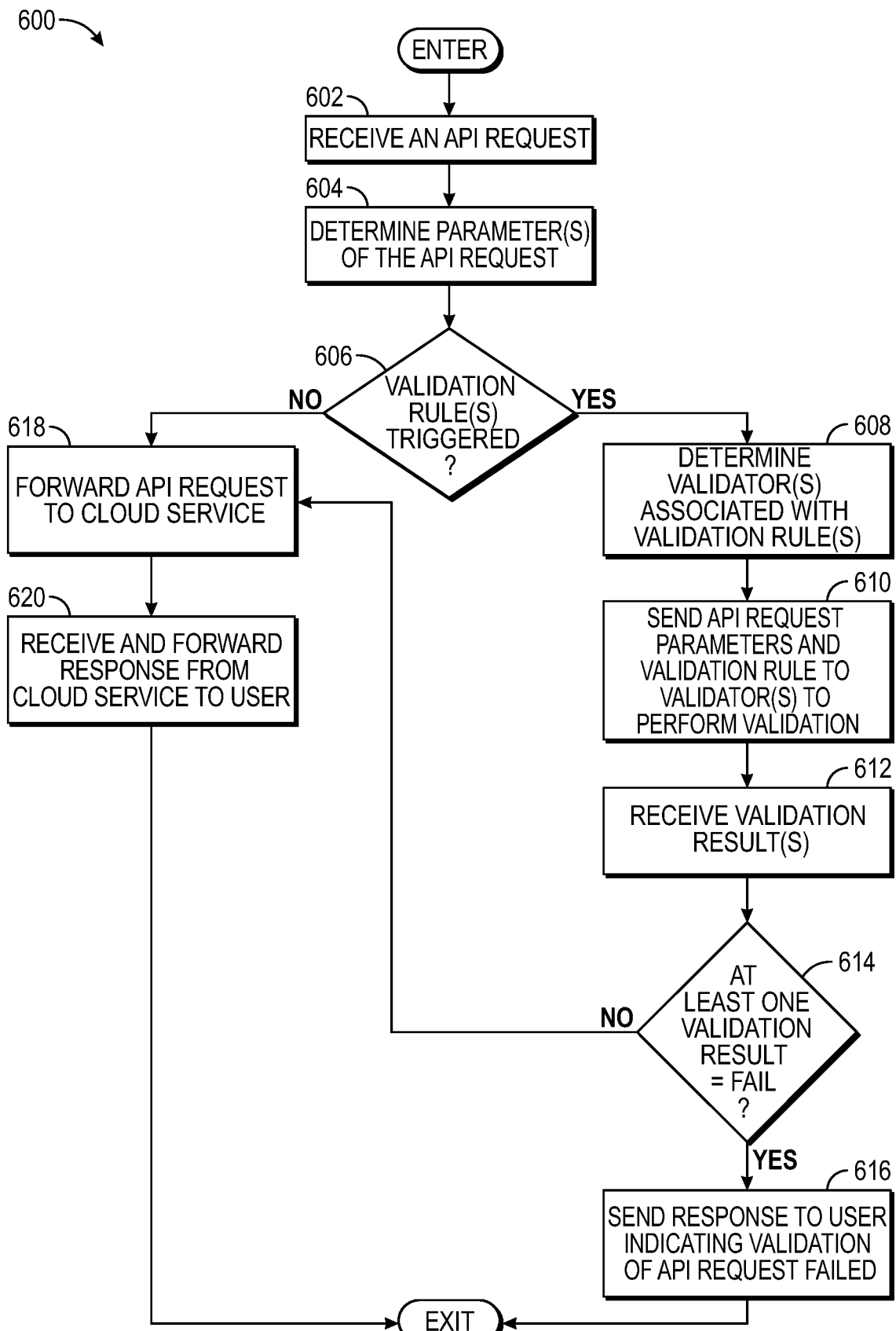
FIG. 6 is a flowchart of a method for validating API requests, according to one embodiment.

FIG. 6 is a flowchart of a method 600 for validating API requests to cloud computing services hosted in a cloud computing environment, according to one embodiment. The method 600 may be performed by one or more components of a gatekeeper service (e.g., gatekeeper service 120).

Method 600 may enter at block 602, where the gatekeeper service receives an API request (e.g., from user 106). At block 604, the gatekeeper service determines parameters (e.g., parameters 202) of the API request. At block 606, the gatekeeper service determines if a validation rule(s) (e.g., validation rule(s) 142) associated with the API request is triggered. As noted above, in one embodiment, the gatekeeper service can query a registration database (e.g., registration database 150) with the parameters to determine if there is an associated validation rule.

If no validation rule is triggered (block 606), then the gatekeeper service forwards the API request to the cloud service (e.g., cloud service 104) (block 618). At block 620, the gatekeeper service receives and forwards the API response (e.g., API response 212) back to the user. On the other hand, if a validation rule(s) is triggered (block 606), then the gatekeeper service determines validator(s) (e.g., validator(s) 180) associated with the validation rule(s) (block 608). At block 610, the gatekeeper service sends the validation rule(s) (and the API request parameters, if required by the validator(s)) to the respective validator(s) to perform validation. At block 612, the gatekeeper service receives validation result(s) (e.g., validation results 210) from the validator(s). If at least one of the validation results indicates a validation failure (e.g., validation result=fail) (block 614), then the gatekeeper service sends a (deny) response to the user indicating validation of the API request failed (block 616). If none of the validation results indicates a validation failure (e.g., validation result=pass), then the gatekeeper service proceeds to perform blocks 618 and 620.

Figure 7:
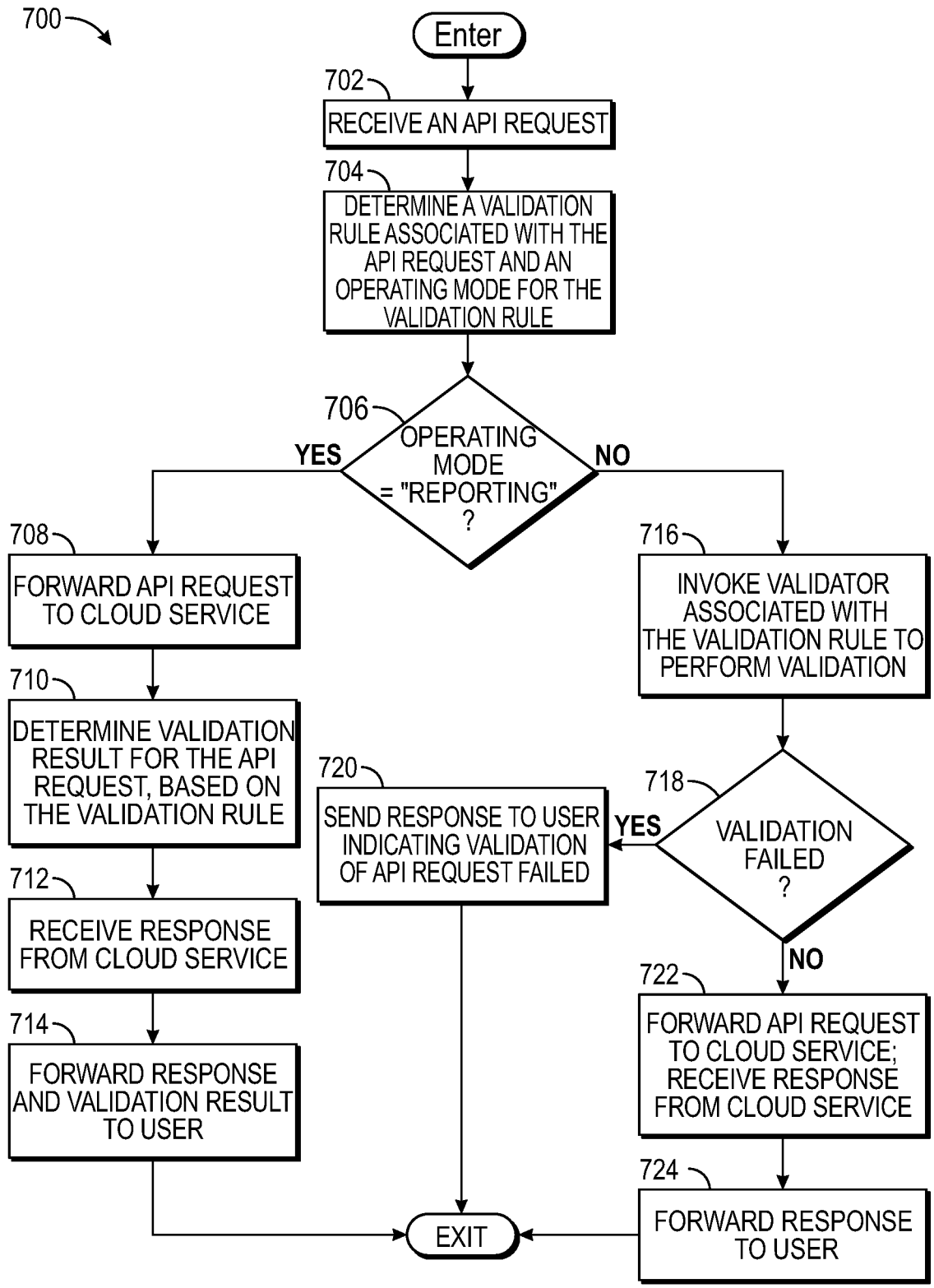
FIG. 7 is a flowchart of another method for validating API requests, according to one embodiment.

FIG. 7 is a flowchart of a method 700 for validating API requests to cloud computing services hosted in a cloud computing environment, according to one embodiment. The method 700 may be performed by one or more components of a gatekeeper service (e.g., gatekeeper service 120).

Method 700 may enter at block 702, where the gatekeeper service receive an API request. At block 704, the gatekeeper service determines a validation rule (e.g., validation rule 142) associated with the API request and an operating mode for the validation rule. For example, as noted, the gatekeeper service can retrieve a policy (e.g., policy 144) associated with the user that indicates the operating mode for the associated validation rule. At block 706, the gatekeeper service determines whether the operating mode is set to "reporting." If so, then the gatekeeper service forwards the API request to the cloud service (e.g., cloud service 104) (block 708).

At block 710, the gatekeeper service determines an (expected) validation result for the API request, based on the validation rule. For example, the gatekeeper service can invoke the respective validator (e.g., validator 180) to perform validation for the API request and receive the validation result (e.g., validation result 210) from the validator. In one embodiment, the gatekeeper service can invoke the respective validator at the same time that the API request is forwarded to the cloud service. At block 712, the gatekeeper service receives a response (e.g., API response 212) from the cloud service. At block 714, the gatekeeper service forwards the response and the validation result to the user. Note that in some cases the gatekeeper service may receive the response from the cloud service prior to determining the validation result for the API request. In these instances, the gatekeeper service may wait until the validation result is determined (e.g., received from a validator) before performing block 714.

If, at block 706, the gatekeeper service determines that the operating mode is not set to "reporting" (e.g., operating mode="enforcing"), then the gatekeeper service invokes the validator associated with the validation rule to perform validation of the API request (block 716). At block 718, the gatekeeper service determines, based on the validation result from the validator, whether the validation failed. If the validation failed, then the gatekeeper service sends a (deny) response to the user indicating validation of the API request failed (block 720). If the validation passes, then the gatekeeper service forwards the API request to the cloud service and receives a response (e.g., API response 212) from the cloud service (block 722). At block 724, the gatekeeper service forwards the response to the user.

Figure 8:
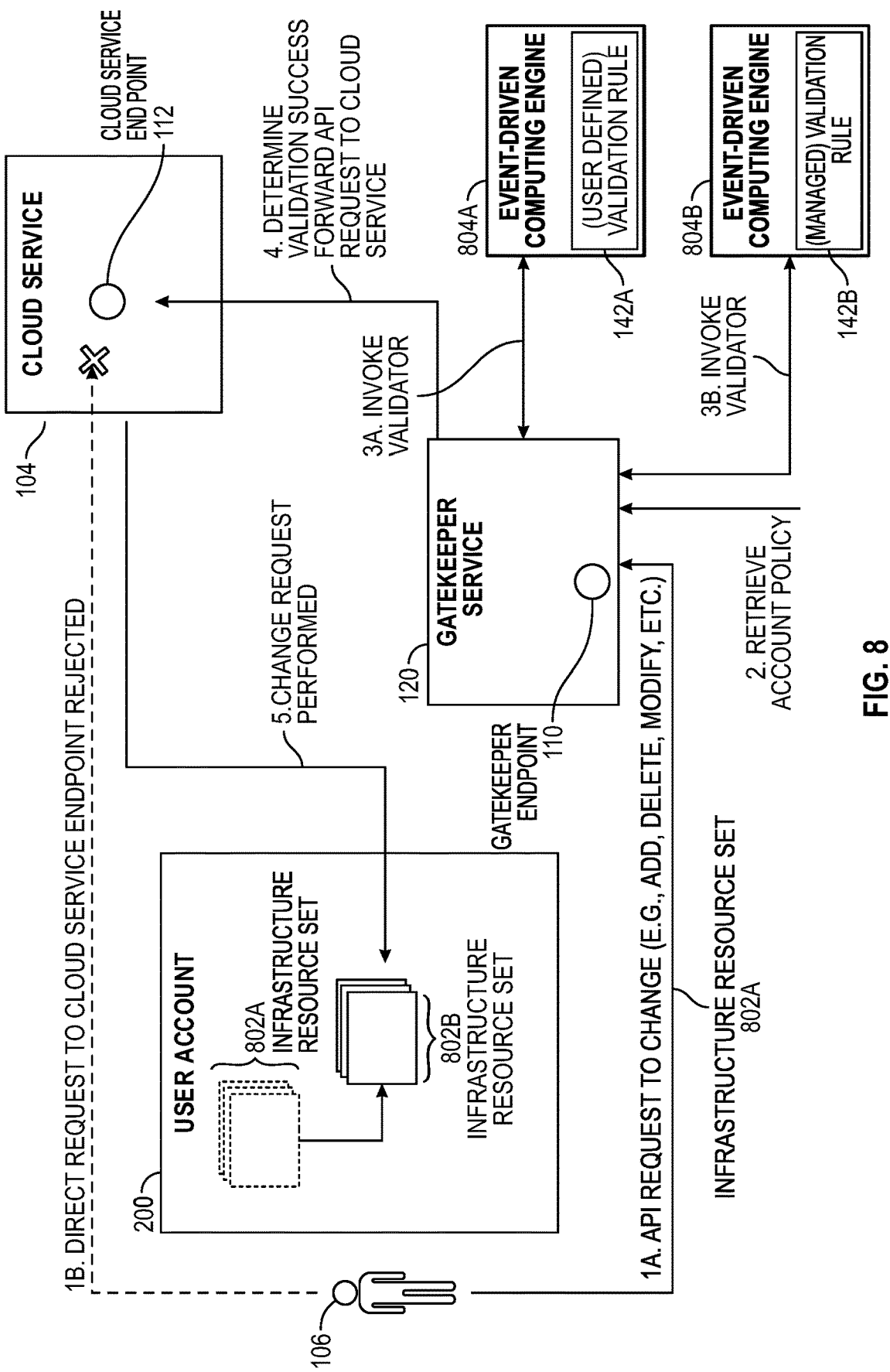
FIG. 8 illustrates an example scenario of using a gatekeeper service to validate API requests, according to one embodiment.

FIG. 8 illustrates an example scenario of using the gatekeeper service 120 to validate an API request to perform an API action, according to one embodiment. As shown, the user 106 submits an API request to change (e.g., add, delete, modify, etc.) the infrastructure resource set 802A within user account 200 (step 1). The infrastructure resource set 802 can be representative of a variety of infrastructure resources (e.g., computing instances, database instances, networking equipment, security policies/rules, active ports, etc.). Once received, the gatekeeper service 120 retrieves the account policy (e.g., policy 144) for the user 106 and determines a set of validators (e.g., validators 180) to perform validation of the API request (step 2).

Here, the gatekeeper service 120 invokes a first validator (e.g., event-driven computing engine 804A) to perform validation, based on (user defined) validation rule 142A and invokes a second validator (e.g., event-driven computing engine 804B) to perform validation, based on (managed) validation rule 142B. At step 4, the gatekeeper service 120 determines validation is successful (e.g., event-driven computing engines 804 A-B return validation=pass), and forwards the API request to the cloud service, in response. At step 5, the API action to change the infrastructure resource set 802A is performed, resulting in infrastructure resource set 802B in the user account 200.

Figure 9:
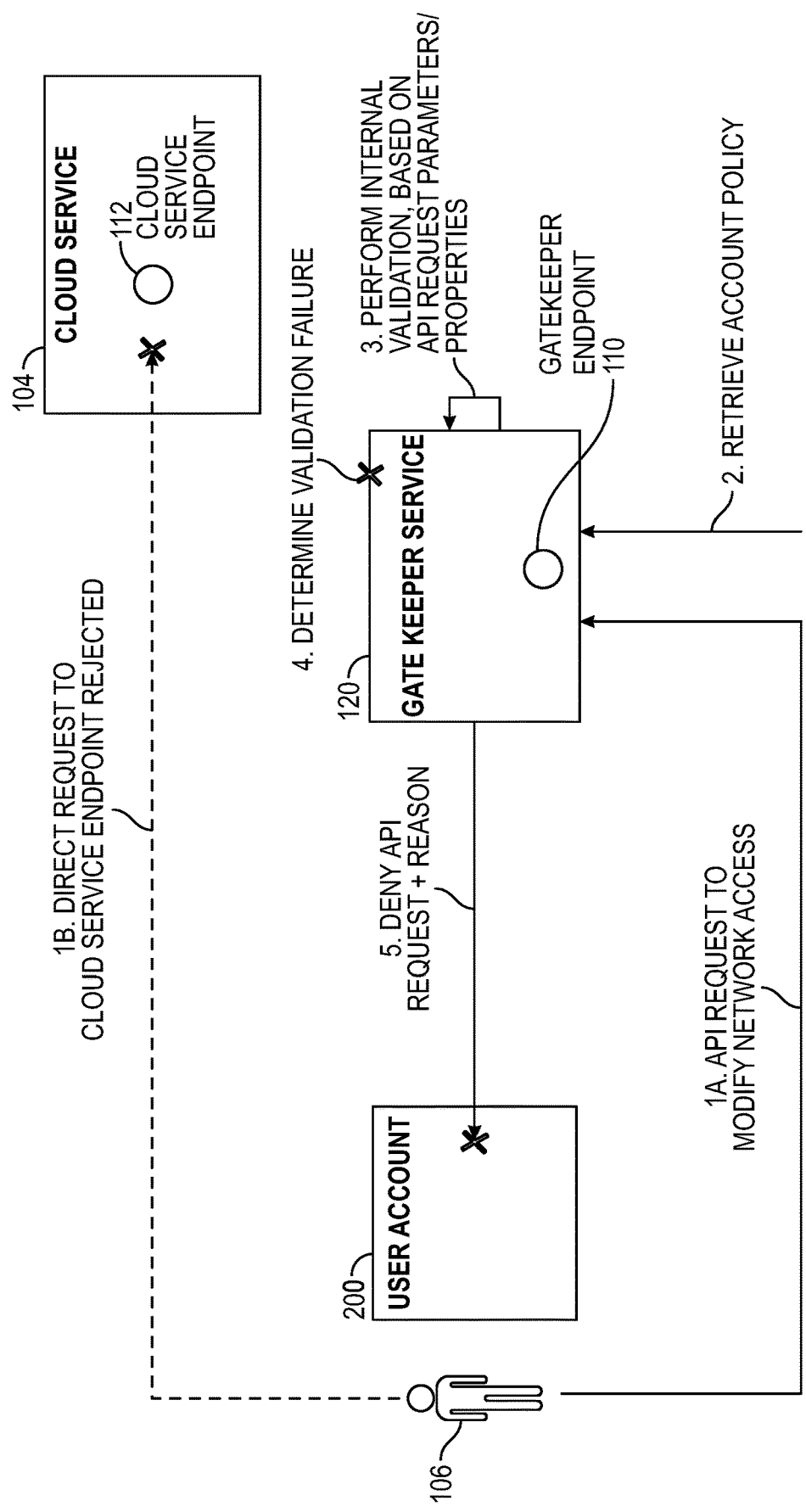
FIG. 9 illustrates another example scenario of using a gatekeeper service to validate API requests, according to one embodiment.

FIG. 9 illustrates another example scenario of using the gatekeeper service 120 to validate an API request to perform an API action, according to one embodiment. As shown, the user 106 submits an API request to modify network access to user account 200 (step 1). For example, the network access can be related to modification of security group ingress rules, launching infrastructure resources within a particular subnet, etc. Once received, the gatekeeper service 120 retrieves the account policy (e.g., policy 144) for the user 106 and determines a set of validators (e.g., validators 180) to perform validation of the API request (step 2).

At step 3, the gatekeeper service 120 performs an internal validation, based on the API request parameters/properties. For example, the gatekeeper service 120 can use a validation engine (e.g., validation engine 302) and/or an auto validator (e.g., auto validator 402) to perform an internal validation of the API request. At step 4, the gatekeeper service 120 determines a validation failure and, in response, sends an API request denial (along with a reason for the denial) to the user.

Figure 10:
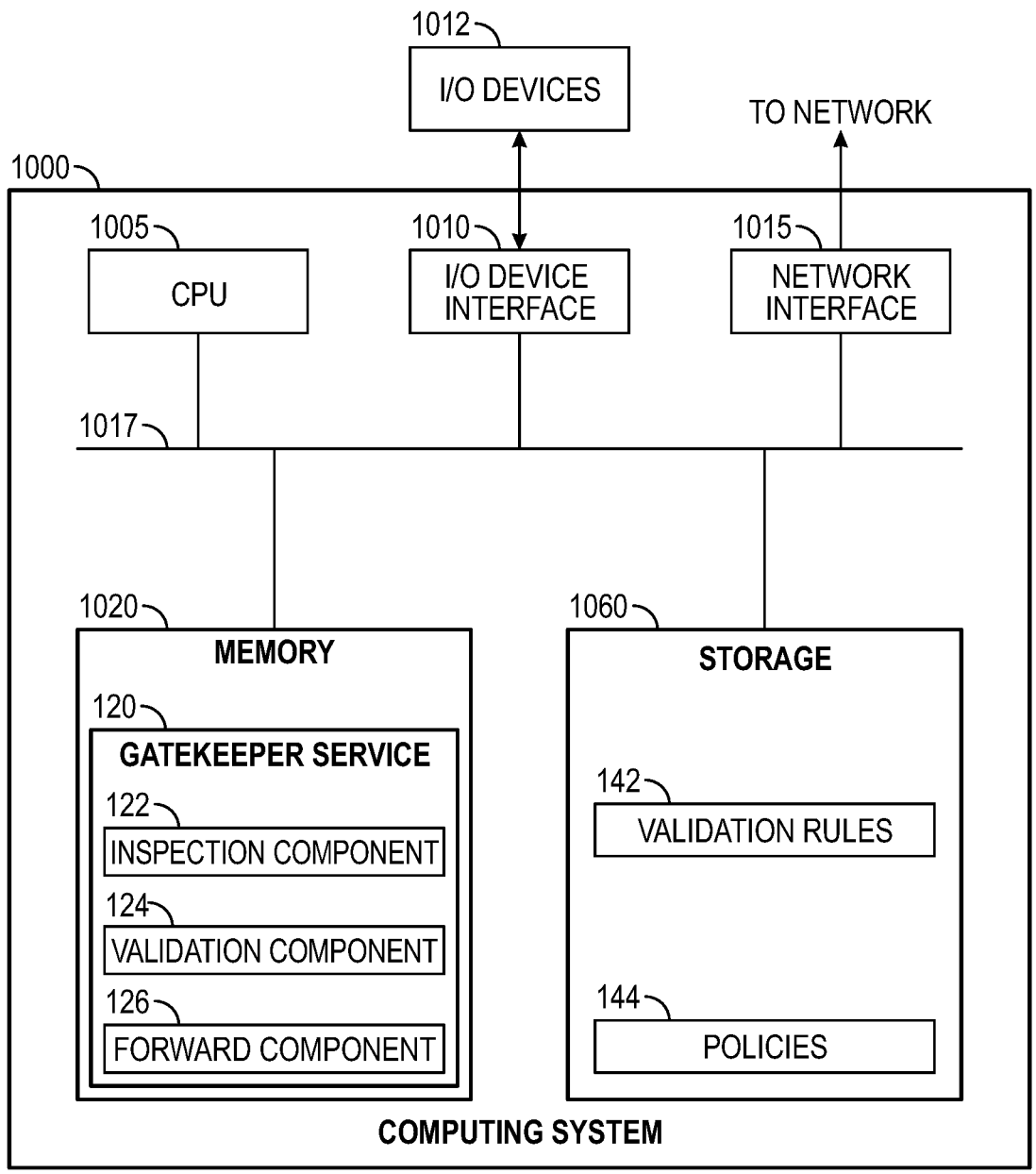
FIG. 10 illustrates an example computing system with a gatekeeper service, according to one embodiment.

FIG. 10 illustrates a computing system 1000 configured to manage non-persistent operator access to infrastructure components hosted in a cloud computing environment, according to one embodiment. As shown, the computing system 1000 includes, without limitation, a central processing unit (CPU) 1005, a network interface 1015, a memory 1020, and storage 1060, each connected to a bus 1017. The computing system 1000 may also include an I/O device interface 1010 connecting I/O devices 1012 (e.g., keyboard, mouse, and display devices) to the computing system 1000. Further, in context of this disclosure, the computing elements shown in the computing system 1000 may correspond to a physical computing system (e.g., a system in a data center) or may be a virtual computing instance executing within a computing cloud.

The CPU 1005 retrieves and executes programming instructions stored in the memory 1020 as well as stores and retrieves application data residing in the memory 1020. The interconnect 1017 is used to transmit programming instructions and application data between CPU 1005, I/O devices interface 1010, storage 1060, network interface 1015, and memory 1020. Note CPU 1005 is included to be representative of a single CPU, multiple CPUs, a single CPU having multiple processing cores, and the like. Memory 1020 is generally included to be representative of a random access memory. The storage 1060 may be a disk drive storage device. Although shown as a single unit, storage 1060 may be a combination of fixed and/or removable storage devices, such as fixed disc drives, removable memory cards, or optical storage, network attached storage (NAS), or a storage area-network (SAN). The storage 1060 includes validation rules 142 and policies 144, which are described in more detail above. Illustratively, the memory 1020 includes the gatekeeper service 120, which includes inspection component 122, validation component 124, and forwarding component 126, which are described in more detail above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., gatekeeper service 120) or related data (e.g., registration database 150) available in the cloud. For example, the gatekeeper service 120 could execute on a computing system in the cloud and perform validation of API requests from callers (e.g., users) to cloud services hosted in the cloud computing environment. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-readable storage medium storing instructions, which, when executed on one or more computing systems, perform an operation for validating an application programming interface (API) request, the operation comprising:
   obtaining, at a validation service in a cloud computing environment, an API request from a user to access a first cloud computing service in the cloud computing environment;
   determining, by the validation service, at least one rule for determining whether the API request is valid, based on one or more parameters of the API request;
   requesting, by the validation service, at least one second cloud computing service to determine, based on the at least one rule, a validation result indicating whether the API request is valid;
   obtaining, by the validation service, an indication of the validation result from the at least one second cloud computing service;
   determining, by the validation service, that the validation result indicates the API request is not valid;
   determining, by the validation service, that an operating mode is a reporting mode in which the at least one rule is not being enforced; and
   upon determining, by the validation service, that the validation result indicates the API request is not valid and the operating mode is a reporting mode in which the at least one rule is not being enforced:
      forwarding, by the validation service, the API request to the first cloud computing service;
      receiving, by the validation service, a first message in response to the API request from the first cloud computing service; and
      sending, by the validation service, a second message based on the first message to the user.

2. The computer-readable storage medium of claim 1, wherein the API request indicates at least one action for the first cloud computing service to perform to infrastructure resources in the cloud computing environment that are associated with the user.

3. The computer-readable storage medium of claim 2, wherein determining whether the API request is valid comprises determining whether the at least one action is allowed to be performed to the infrastructure resources.

4. The computer-readable storage medium of claim 1, wherein:
   the at least one second cloud computing service comprises an event-driven computing service; and
   requesting the at least one second cloud computing service to determine the validation result comprises triggering, via the event-driven computing service, execution of one or more functions associated with the at least one rule.

5. The computer-readable storage medium of claim 1, the operation further comprising, upon determining, by the validation service, that the validation result indicates the API request is not valid and the operating mode is a reporting mode in which the at least one rule is not being enforced, providing an indication that the API request would have been denied if the at least one rule were being enforced.

6. A computer-implemented method comprising:
   receiving, at a first cloud computing service in a cloud computing environment, an application programming interface (API) request from a user to access a second cloud computing service in the cloud computing environment;
   determining whether at least one action indicated in the API request is allowed to be performed, based at least in part on one or more parameters of the API request, comprising:
      determining, based on the one or more parameters of the API request, there is at least one validation rule associated with the API request;
      upon determining there is at least one validation rule associated with the API request, (i) identifying at least one computing system designated for evaluating the API request and (ii) triggering the at least one computing system to evaluate the API request according to the validation rule; and
      determining that the at least one action is not allowed to be performed;
   determining that an operating mode is a reporting mode in which the at least one validation rule is not being enforced; and
   upon determining that the at least one action is not allowed to be performed, and the operating mode is a reporting mode in which the at least one validation rule is not being enforced, forwarding, by the first cloud computing service, the API request to the second cloud computing service.

7. The computer-implemented method of claim 6, further comprising:
   receiving a message in response to the API request from the second cloud computing service, after forwarding the API request; and
   relaying the message to the user.

8. The computer-implemented method of claim 6, wherein:
   the first cloud computing service comprises a reverse proxy; and
   the API request is received at the reverse proxy via a single endpoint of the reverse proxy.

9. The computer-implemented method of claim 6, wherein:
   the at least one computing system comprises an event-driven computing service;
   the at least one validation rule comprises custom configured logic for determining whether the at least one action is allowed to be performed; and
   triggering the at least one computing system comprises invoking the event-driven computing service to execute the custom configured logic.

10. The computer-implemented method of claim 6, wherein:
    the first cloud computing service comprises the at least one computing system; and
    the at least one validation rule comprises logic based on the one or more parameters of the API request.

11. The computer-implemented method of claim 6, wherein:
    the at least one validation rule indicates a time period for performing the at least one action; and
    triggering the at least one computing system comprises querying the at least one computing system to determine whether the at least one action is allowed during the time period.

12. The computer-implemented method of claim 6, wherein:
    the at least one validation rule indicates one or more predetermined criteria; and triggering the at least one computing system comprises querying the at least one computing system to determine whether the one or more predetermined criteria are satisfied.

13. The computer-implemented method of claim 12, wherein the one or more predetermined criteria are based on a current state of an infrastructure resource in the cloud computing environment.

14. The computer-implemented method of claim 6, wherein:
the at least one computing system comprises a machine learning model; and
triggering the at least one computing system comprises evaluating at least one of the validation rule, the one or more parameters of the API request, a configuration of infrastructure resources in the cloud computing environment, and user feedback with the machine learning model to determine whether the at least one action is allowed.

15. The computer-implemented method of claim 6, further comprising upon determining that the at least one action is not allowed to be performed, sending, by the first cloud computing service, a first message to the user indicating that the API request is denied.

16. The computer-implemented method of claim 15, further comprising sending a second message to the user indicating a reason why the API request is denied.

17. A computer-implemented method comprising:
receiving, at a first cloud computing service in a cloud computing environment, an application programming interface (API) request from a user, the API request indicating at least one action for a second cloud computing service to perform to infrastructure resources in the cloud computing environment;
determining a governance policy associated with the API request, wherein the governance policy indicates (i) at least one validation rule associated with the API request and (ii) an operating mode;
determining, based at least in part on the at least one validation rule, that the at least one action is not allowed to be performed;
determining that the operating mode is a reporting mode in which the at least one validation rule is not being enforced; and
based upon determining that (i) the at least one action is not allowed to be performed and (ii) the operating mode is a reporting mode in which the at least one validation rule is not being enforced:
forwarding, by the first cloud computing service, the API request to the second cloud computing service;
receiving, by the second cloud computing service, a first message in response to the API request from the first cloud computing service; and
sending, by the first cloud computing service, a second message based on the first message to the user.

18. The computer-implemented method of claim 17, further comprising sending a second message with the first message indicating that the at least one action is not allowed to be performed.

19. The computer-implemented method of claim 18, wherein determining whether the at least one action is allowed to be performed comprises:
triggering an event-driven computing service to execute the at least one validation rule associated with the API request; and
receiving an indication of whether the at least one action is allowed to be performed from the event-driven computing service.

20. The computer-implemented method of claim 19, wherein the at least one validation rule comprises custom configured logic for determining whether the at least one action is allowed to be performed.

* * * * *